United States Patent [19]

Kondo

[11] Patent Number: 4,838,803
[45] Date of Patent: Jun. 13, 1989

[54] CONNECTOR DEVICE

[75] Inventor: Shiro Kondo, Furukawa, Japan

[73] Assignee: Alps Electric Co., Ltd., Japan

[21] Appl. No.: 90,165

[22] Filed: Aug. 27, 1987

[30] Foreign Application Priority Data

Oct. 21, 1986 [JP] Japan ................... 61-160084
Oct. 29, 1986 [JP] Japan ................... 61-164926

[51] Int. Cl.⁴ .............................................. H01R 35/00
[52] U.S. Cl. .................................... 439/164; 435/15
[58] Field of Search ...................... 439/13, 15, 164; 174/117 F, 117 FF

[56] References Cited

U.S. PATENT DOCUMENTS 856,982  4/1940  France ........................... 439/164
4,045,750  8/1977  Marshall ................. 174/117 FF X

FOREIGN PATENT DOCUMENTS 563090  12/1957  Belgium ..................... 174/117 F
0071875  2/1983  European Pat. Off. .......... 439/13

Primary Examiner—Eugene F. Desmond
Attorney, Agent, or Firm—Guy W. Shoup; Paul J. Winters; Norman R. Klivans

[57] ABSTRACT

There is disclosed a connector device installed on an automotive steering wheel. The device comprises a stationary body, a movable body capable of rotating relative to the stationary body, and two belt-like flat cables stacked on each other. The cables are mounted in the space formed between the stationary body and the movable body. Each cable is wound with a given turns, and comprises two base sheet of film bonded together. Several straight conductors are juxtaposed and sandwiched between the base sheets.

2 Claims, 2 Drawing Sheets

Fig. 5
Fig. 4
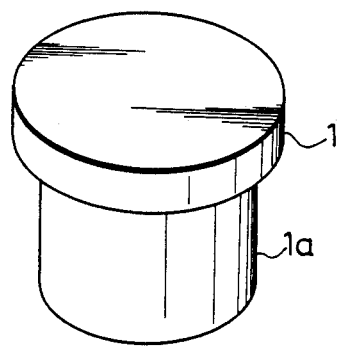
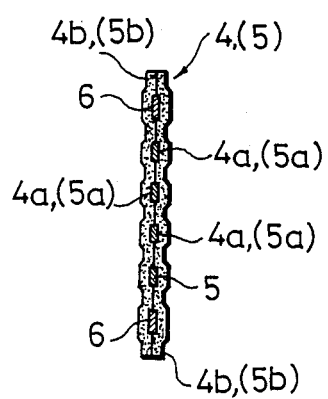
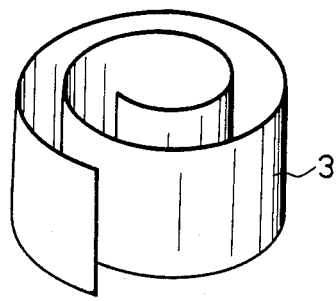
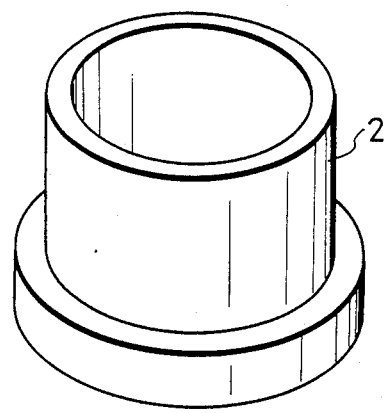

CONNECTOR DEVICE

FIELD OF THE INVENTION

The present invention relates to a connector device for electrically connecting a movable body with a stationary body via flat cables which are disposed between them and wound with a plurality of turns and, more particularly, to a connector device adapted for an automotive steering wheel.

BACKGROUND OF THE INVENTION

Connectors of this kind are known and used on an automotive steering wheel as shown in FIG. 5 and in other applications. Referring to FIG. 5, a movable body 1 has a cylindrical portion 1a of a reduced diameter, and a steering wheel (not shown) is firmly fixed to the body 1. A stationary body 2 rotatably holds the movable body 1. In this assembled state, a given space is defined between the outer periphery of the cylindrical portion 1a and the inner surface of the stationary body 2 in which the cylindrical portion 1a is inserted. Several turns of a belt-like flat cable 3 are received in this space. The inner end of the cable 3 is attached to the movable body 1, while the outer end is fixed to the stationary body 2. When the movable body 1 rotates, the cable 3 is wound or unwound according to the direction of the rotation. Thus, the diameter of the cable varies. The cable 3 is fabricated by inserting a plurality of conductive sheets made of copper or other highly conductive material between two base sheets of a flexible film as made from polyester. Electric signals are transmitted between the movable body 1 and the stationary body 2. For example, a signal indicating an automobile horn is fed from the movable body, or steering wheel, to the stationary body.

Electrical devices which have been practically mounted on the steering wheel are not restricted to an automobile horn as mentioned above. For instance, light switches and various other devices are installed on it. Where several kinds of electrical devices are mounted on the movable steering wheel, especially when it is necessary to install a number of input keys of an automobile telephone, for example, on the steering wheel, the number of the signal lines is very large accordingly. In the conventional structure where one flat cable is wound as described above, the cable is very wide. This makes it difficult to install it on the steering wheel which has a limited width.

Also, where several kinds of electrical devices are installed on the steering wheel, the electric currents consumed by these devices are not always of the same order. Sometimes, relatively large electric currents must be supplied to some conductive sheets of the cable, whereas minute currents must be fed to other conductive sheets. In this case, with the conventional structure making use of the conductive sheets of the single flat cable to supply electric currents, all the circuits are required to use an expensive flat cable, based on the circuit consuming a large amount of current. As an example, such an expensive cable consists of a wide plate of copper coated with heat-resistant base film as made from polyimide. Hence, it has been difficult to fabricate the conventional structure economically.

Further, in the conventional flat cable used in the connector device, relatively soft conductive sheets as made of copper are held between base sheets of film. Therefore, the resistance of the cable to flexure is not sufficiently high. Thus, when the movable body rotates and the diameter of the cable varies as mentioned above, there is the possibility that the cable is bent at a location, causing the corresponding conductive sheets to break. Especially, when the number of turns of the cable is reduced and the cable is shortened, a larger friction takes place between neighboring turns of the cable. Consequently, the aforementioned tendency becomes more conspicuous.

SUMMARY OF THE INVENTION

Accordingly, it is an object of the present invention to provide a connector device which comprises flat cables having improved resistance to flexure between a stationary body and a movable body, is free of the foregoing problems with the prior art techniques, assures electrical connection between the bodies, and is capable of transmitting a number of signals, though the cables are installed in a narrow space.

The above object is achieved by a connector device comprising: a stationary body; a movable body capable of rotating relative to the stationary body; and a plurality of belt-like flat cables stacked on each other and mounted in the space formed between the stationary body and the movable body, each of the cables being wound with a given turns, each of the cables comprising a plurality of conductors juxtaposed on a base sheet of film, the stationary body being electrically connected with the movable body via the conductors.

Since the individual flat cables are installed in the space between the stationary body and the movable body, it is possible to send signals from different kinds of circuits consuming very different amounts of electric current to the stationary body, the circuits being installed on the movable body. Because the cables are stacked and wound, the radial dimension of the space is small, but the amount of the radial movement of each cable per unit amount of angular movement of the movable body is small. Consequently, the space is utilized efficiently, and the connector device can be made in smaller size.

Other objects and features of the invention will appear in the course of the description thereof which follows.

BRIEF DESCRIPTION OF THE DRAWINGS

FIG. 4 shows cross-sectional views of FIGS. 2 and 3; and

FIG. 5 is an exploded perspective view of a conventional connector device.

DETAILED DESCRIPTION OF THE INVENTION

Figure 1:
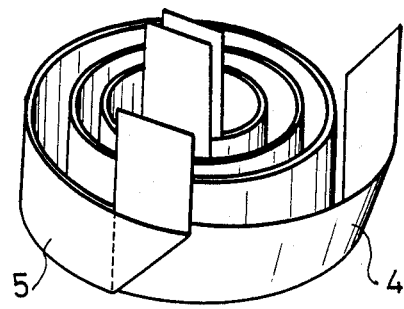
FIG. 1 is a perspective view of flat cables for use in a connector device according to the invention.

Referring to FIG. 1, there are shown flat cables for use in a connector device according to the invention. The first flat cable 4 and the second flat cable 5 are almost identical in width and received in the cylindrical space between a movable body (not shown) and a stationary body (not shown). Each of the cables is wound with a plurality of turns. The inner end of each cable is firmly fixed to the movable body, while the outer end is securely attached to the stationary body.

Figure 2:
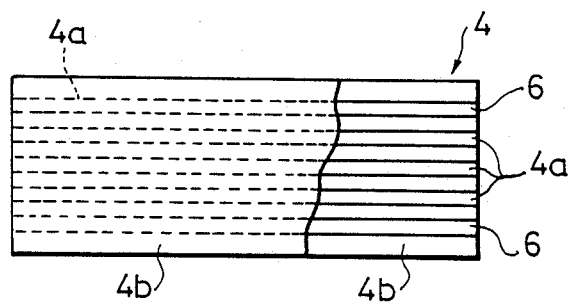
FIG. 2 is a partially cutaway plan view of the first flat cable shown in FIG. 1.

Referring next to FIG. 2, the first flat cable 4 comprises a plurality of conductors 4a held between two base sheets 4b of heat-resistant film as made from polyimide. The conductors 4a are made of a highly conductive material such as copper. The cable 4 is used for a circuit that consumes a relatively large amount of electric current, such as an automotive horn circuit.

Figure 3:
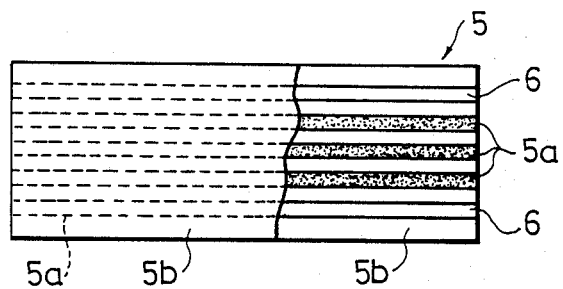
FIG. 3 is a partially cutaway plan view of the second flat cable shown in FIG. 1.

Referring to FIG. 3, the second flat cable 5 comprises a base sheet of film 5b, a conductive pattern 5a printed on the base film 5b, and a second sheet of film 5b. The base film 5b is made from an inexpensive material that is inferior in resistance to heat, such as polyester. The pattern 5a consists of conductors of silver ink or the like, and is sandwiched between the two base sheets 5b. The cable 5 is employed for a circuit consuming a relatively small amount of electric current, such as the signal input circuit of a telephone.

In this way, the signal line extending from the movable body, or steering wheel, to the stationary body, is divided between the conductors 4a and 5a of the first cable 4 and the second cable 5 having different capacities of electric current. The width or height of the space between the movable body and the stationary body can be halved as compared with the prior art device. Since the two cables 4 and 5 are stacked, it is necessary to increase the radial dimension of the space. However, this increase poses almost no problem, because the radial dimension of each of the cables 4 and 5 varies less per unit amount of angular movement of the movable body.

Referring to FIG. 4, each of the cables 4 and 5 is fabricated by holding reinforcing plates 6 and conductive sheets 4a or 5a between two base sheets of film 4b or 5b, and then coupling together the sheets 4b or 5b by thermal fusion or with adhesive. The reinforcing plates 6 extend parallel at both ends of the cable. The conductive sheets 4a and 5a are made of a material that is not highly elastic but exhibits a high electric conductivity, such as copper, aluminum, or silver ink. The conductive sheets 4a and 5a are used to convey electric signals, while the reinforcing plates 6 are not employed for this purpose. Therefore, the plates 6 are made of an inexpensive material which has a much larger modulus of elasticity than that of the conductive sheets 4a and 5a, such as stainless steel. The electric conductivity of the plates 6 are not of importance.

The reinforcing plates 6 embedded at both ends of the base sheets of film 4b and 5b greatly enhance the resistance of the flat cables 4 and 5 to flexure. Therefore, as the movable body, or the steering wheel, rotates, the cables 4 and 5 move smoothly without twisting in response to the rotation. Hence, a bend of each cable which would have been heretofore caused when it unwinds and concomitant breaking of the conductive sheets can be prevented.

In the above example, the increase in the resistance of the cables 4 and 5 to flexure permits a decrease in the number of turns of the cables. In other words, the required length of the cables 4 and 5 can be reduced. Consequently, the price of the unit length of the cables 4 and 5 is somewhat increased because of the provision of the reinforcing plates 6, but the price of the whole connector device is low as compared with the prior art device.

Also in the example described above, the two flat cables 4 and 5 having different capacities of electric current are stacked and wound. It is also possible to stack flat cables of the same kind, for conveying a number of signals. Further, the number of the stacked cables is not limited to two as in the above example; three or more cables may be stacked.

As described above, the present invention makes use of stacked flat cables. Therefore, it is possible to transmit a number of signals between the movable body and the stationary body simultaneously. Therefore, the connector device can be fabricated in small size. Especially, the height or width can be made small. Since resilient reinforcing plates are embedded at the lateral ends of base sheets of film, the resistance of the plural turns of the flat cables to flexure is improved. Thus, a connector device which is inexpensive and assures electrical connection is provided.

What is claimed is:

1. A connector device comprising:
   a stationary body;
   a movable body capable of rotating relative to the stationary body; and
   a plurality of belt-like flat cables stacked on each other and mounted in the space formed between the stationary body and the movable body, each of the cables being wound with a given number of turns, each of the cables including a plurality of identical conductors juxtaposed on a base sheet of film, the stationary body being electrically connected with the movable body via the conductors;
   wherein the conductors of a first cable of the plurality of cables are made from a material which differs in capacity of electric current per unit area from a material of which the conductors of a second cable of the plurality of cables are made.

2. A connector device as set forth in claim 1, wherein reinforcing plates made from a material having a modulus of elasticity larger than that of the base sheet of film are embedded in the base sheet so as to extend along the longitudinal ends of the base sheet.

* * * * *